(12) United States Patent
Psaila

(10) Patent No.: US 11,440,340 B2
(45) Date of Patent: Sep. 13, 2022

(54) TAXIDERMY MOUNTING APPARATUS

(71) Applicant: Anthony Paul Joseph Psaila, Salt Rock (CA)

(72) Inventor: Anthony Paul Joseph Psaila, Salt Rock (CA)

( * ) Notice: Subject to any disclaimer, the term of this patent is extended or adjusted under 35 U.S.C. 154(b) by 218 days.

(21) Appl. No.: 16/648,389

(22) PCT Filed: Jul. 31, 2018

(86) PCT No.: PCT/IB2018/055711
§ 371 (c)(1),
(2) Date: Mar. 18, 2020

(87) PCT Pub. No.: WO2019/053526
PCT Pub. Date: Mar. 21, 2019

(65) Prior Publication Data
US 2020/0282765 A1 Sep. 10, 2020

(30) Foreign Application Priority Data
Sep. 18, 2017 (ZA) .................................. 2017/06310

(51) Int. Cl.
*B44C 5/02* (2006.01)
*G09B 23/36* (2006.01)

(52) U.S. Cl.
CPC .............. *B44C 5/02* (2013.01); *G09B 23/36* (2013.01)

(58) Field of Classification Search
CPC ... B44C 5/02; G09B 23/36; B29L 2031/7028; B29L 2031/702
See application file for complete search history.

(56) References Cited

U.S. PATENT DOCUMENTS 2,614,955 A * 10/1952 Halsall .................. B29C 70/446
264/236
2,831,271 A * 4/1958 Stitt ........................ G09B 23/36
434/296

(Continued)

FOREIGN PATENT DOCUMENTS

DE    102013105534 B3 *  6/2014  ................ A47F 8/00
FR        544252 A   *  9/1922  ................ A63H 9/00

(Continued)

OTHER PUBLICATIONS

International Search Report and Written Opinion for PCT/IB2018/055711; dated Jun. 24, 2019; 11 pages.

*Primary Examiner* — Eret C McNichols
(74) *Attorney, Agent, or Firm* — Barclay Damon LLP

(57) ABSTRACT

This invention relates to a taxidermy mounting apparatus. More particularly, there is provided for a taxidermy mounting apparatus comprising a backing board, a mannequin moulded on the backing board and a mounting device for use in mounting the mannequin and backing board relative to a supporting structure, the mounting device comprising a female member fixed non-rotatably in the mannequin and having an elongate socket extending therein to an open mouth aligned with an opening in the backing board, the socket being configured to receive, in use and in a non-rotatable manner, an elongate male member extending laterally from the supporting structure, such that the male member can then support the mounting apparatus relative to the supporting structure.

12 Claims, 5 Drawing Sheets

(56) References Cited

U.S. PATENT DOCUMENTS

| | | | | |
|---|---|---|---|---|
| 3,281,029 A * | 10/1966 | Bloch | ................ | A47F 8/00 223/120 |
| 4,464,440 A * | 8/1984 | Dotzman | ................ | B44C 5/02 428/16 |
| 4,565,346 A * | 1/1986 | Edwards | ................ | H01Q 1/1264 248/122.1 |
| 4,717,626 A * | 1/1988 | Badger | ................ | B44C 5/02 428/16 |
| 5,015,532 A * | 5/1991 | Knight | ................ | B44C 5/02 428/16 |
| 5,472,765 A * | 12/1995 | Green | ................ | B44C 5/02 428/16 |
| 5,779,294 A | 7/1998 | Magri | | |
| 6,203,396 B1 * | 3/2001 | Asmussen | ................ | A47F 8/00 446/268 |
| 6,364,261 B1 * | 4/2002 | Vass, Jr. | ................ | A47B 96/07 248/220.1 |
| 6,458,434 B1 | 10/2002 | Coombs, Jr. | | |
| 6,561,468 B2 * | 5/2003 | Williamson | ................ | A47F 5/0807 248/146 |
| 6,828,035 B1 * | 12/2004 | Goettl | ................ | B44C 5/02 211/103 |
| 7,207,535 B1 | 4/2007 | Giuliani | | |
| 7,655,318 B2 * | 2/2010 | Hall | ................ | B44C 5/06 428/542.4 |
| 8,899,538 B2 * | 12/2014 | Wertz | ................ | G09B 23/36 248/225.11 |
| D736,579 S * | 8/2015 | Hauser | ................ | D8/34 |
| 9,248,696 B2 * | 2/2016 | Maria | ................ | B44C 5/02 |
| 10,118,437 B1 | 11/2018 | Weaver | | |
| 10,242,599 B1 * | 3/2019 | Herron | ................ | G09B 23/36 |
| 10,717,317 B2 * | 7/2020 | Nobi | ................ | B44C 5/02 |
| 10,718,465 B2 * | 7/2020 | Wall | ................ | G09B 23/36 |
| 2006/0154224 A1 * | 7/2006 | St.Ama | ................ | G09B 23/36 434/296 |
| 2008/0164399 A1 | 7/2008 | Hall | | |
| 2008/0197158 A1 * | 8/2008 | Tu | ................ | A47F 8/00 223/66 |
| 2009/0026347 A1 | 1/2009 | Noon | | |
| 2010/0072339 A1 | 3/2010 | Powell et al. | | |
| 2011/0036959 A1 | 2/2011 | Raby | | |
| 2012/0043442 A1 | 2/2012 | Heffernon | | |
| 2012/0151737 A1 | 6/2012 | Wertz | | |
| 2013/0014373 A1 * | 1/2013 | Jordan | ................ | B29C 33/3842 29/428 |
| 2014/0230220 A1 * | 8/2014 | Allred | ................ | G09B 23/36 29/428 |
| 2015/0056593 A1 | 2/2015 | Lennard | | |
| 2015/0076731 A1 * | 3/2015 | Walton, Jr. | ................ | A01N 1/00 264/242 |
| 2015/0130103 A1 * | 5/2015 | Dewey | ................ | G09B 23/36 264/46.6 |
| 2015/0198199 A1 * | 7/2015 | Wu | ................ | A63H 3/46 403/119 |
| 2016/0302594 A1 * | 10/2016 | Firestone | ................ | F16C 11/12 |
| 2017/0080745 A1 * | 3/2017 | Nobi | ................ | B44C 5/02 |
| 2019/0275832 A1 * | 9/2019 | Eads | ................ | A47F 5/0807 |
| 2020/0049306 A1 * | 2/2020 | Wall | ................ | F16M 11/22 |

FOREIGN PATENT DOCUMENTS

| | | | | |
|---|---|---|---|---|
| GB | 2353949 A * | 3/2001 | ................ | B44C 5/02 |
| WO | WO 2019/053526 A2 | 3/2019 | | |

* cited by examiner

TAXIDERMY MOUNTING APPARATUS

CROSS-REFERENCE TO RELATED APPLICATIONS

This application is a national stage application pursuant to 35 U.S.C. § 371 of International Application No. PCT/IB2018/055711, filed Jul. 31, 2018, which claims priority upon South African Patent Application No. 2017/06310, filed Sep. 18, 2017, the entire contents of each application herein being incorporated by reference.

BACKGROUND TO THE INVENTION

THIS invention relates to a taxidermy mounting apparatus.

It is common for taxidermists to make use of a pre-moulded mannequin onto which body parts, skin and other components of the trophy or exhibit can be laid during the taxidermy procedure. During this procedure the mannequin is supported by a taxidermy stand which is adjustable to allow the taxidermist to position the mannequin in various different ways to facilitate the procedure. The stand may be automated or manually operated.

Commonly, the mannequin is moulded onto a backing board and the mounting stand includes a projecting bar or rod carrying a bracket at its end which is fastened to the board. The board is typically of laminated plywood and the required fastening is achieved by means of screws passing through the bracket and screwed into the plywood, with the board, mannequin and other components laid thereon then supported cantilever fashion. As the supported load can be substantial the board must be thick enough for the screws to get the required purchase. The added thickness of plywood adds to the overall supported weight which may be such that it is not unusual for the screws to pull free to some extent and allow the mannequin to "creep" or sag relative to the mounting stand as a result. Such undesired movements of the mannequin can increase the difficulty of the taxidermy procedure, and the additional thickness of wood can increase the overall cost.

In many of the known mounting arrangements the mounting stand includes a sleeve through which the rod passes. The rod can be locked at selected rotational positions, corresponding to different rotational positions of the mannequin, by means of a grub screw which screws through the sleeve into engagement with the rod. However, if the supported load is substantial and unbalanced, the grub screw fixture may be insufficient to restrain the mannequin from undesired rotational movements.

It is an objective of the present invention to address the problem of undesired movement of the mannequin during the taxidermy procedure.

SUMMARY OF THE INVENTION

One aspect of the present invention provides a taxidermy mounting apparatus comprising a backing board, a mannequin moulded on the backing board and a mounting device for use in mounting the mannequin and backing board relative to a supporting structure, the mounting device comprising a female member fixed non-rotatably in the mannequin and having an elongate socket extending therein to an open mouth aligned with an opening in the backing board, the socket being configured to receive, in use and in a non-rotatable manner, an elongate male member extending laterally from the supporting structure, such that the male member can then support the mounting apparatus relative to the supporting structure.

In an embodiment, the mounting device includes a flange from which the female member extends transversely with the open mouth of the socket at the flange. The flange may be located against a rear surface of the backing board with the open mouth of the socket accessible through the opening in the backing board. The flange may be attached to the backing board by means of one or more suitable fasteners. Preferably the flange and female member are provided as a one-piece moulding of a suitable plastics material.

In a preferred embodiment, the socket of the female member has a non-round cross-section for non-rotatable reception of a male member having a complemental, non-round cross-section. In one embodiment, the socket has a hexagonal cross-section to receive a male member of complemental hexagonal cross-section. In an alternative arrangement, the socket may be internally splined to receive an externally splined male member.

The female member preferably has an outer surface carrying laterally projecting irregularities, in one embodiment in the form of fins, which anchor the female member against rotation in the body of the mannequin.

Another aspect of the invention provides a mounting device for use in a taxidermy mounting apparatus which comprises the mounting device, a backing board and a mannequin moulded on the backing board, the mounting device comprising a female member having an elongate socket extending therein to an open mouth, the female member being mouldable non-rotatably in the body of the mannequin with the open mouth of the socket positioned to receive, in use and in a non-rotatable manner, an elongate male member extending laterally from a supporting structure, such that the male member can then support the mounting apparatus relative to the supporting structure.

Another aspect of the present invention provides a taxidermy mounting system comprising a taxidermy mounting apparatus as summarised above and a supporting structure for supporting the taxidermy mounting apparatus, the supporting structure having a laterally projecting male member receivable non-rotatably in the socket of the female member thereby to provide support for the mounting apparatus relative to the supporting structure.

Yet another aspect of the invention provides a wall mount system for a taxidermy exhibit, the wall mount system comprising a taxidermy mounting apparatus as summarized above and a wall mount device comprising a flange for location against and fixture to a wall and a male member projecting from the flange for non-rotatable reception in the socket of the female member of the taxidermy mounting apparatus whereby the apparatus is supported relative to the wall by the male member.

A further aspect of the invention provides a method of supporting a taxidermy mannequin and a backing board on which the mannequin is moulded, the method comprising the steps of:

providing a taxidermy mounting device which comprises a female member fixed non-rotatably in the mannequin and having an elongate socket extending therein to an open mouth aligned with an opening in the backing board;

providing a supporting structure that includes a laterally projecting male member which is slidably and non-rotatably receivable in the socket of the mounting device at any selected one of a plurality of rotational positions; and sliding the male member of the supporting structure into the socket of the mounting device thereby to support the mannequin relative to the supporting structure.

The supporting structure may for example be a taxidermy stand with the facility for fully automated, semi-automated or manual adjustment. Alternatively, it may comprise a base for supporting a taxidermy exhibit in a pedestal mount application.

Another aspect of the invention provides a method of mounting a taxidermy exhibit on a wall, the taxidermy exhibit including a taxidermy mannequin and a backing board on which the mannequin is moulded, the method comprising the steps of:

providing a taxidermy mounting device which comprises a female member fixed non-rotatably in the mannequin and having an elongate socket extending therein to an open mouth aligned with an opening in the backing board;

providing a wall mount device comprising a flange for location against and fixture to a wall and a male member projecting from the flange for non-rotatable slide reception in the socket of the mounting device;

fixing the flange of the wall mount device to the wall; and sliding the male member of the wall mount device into the socket of the mounting device thereby to support the taxidermy exhibit relative to the wall.

BRIEF DESCRIPTION OF THE DRAWINGS

The invention will now be described in more detail, by way of example only, with reference to the accompanying drawings in which.

DETAILED DESCRIPTION OF THE DRAWINGS

Figure 1:
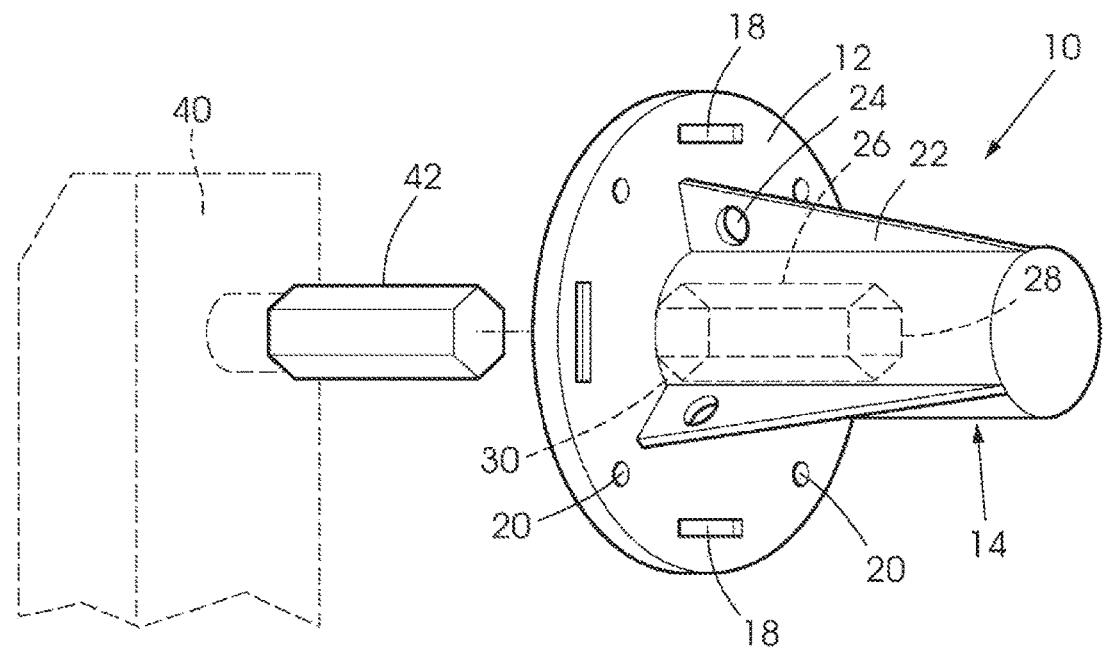
FIG. 1 is an exploded perspective view in which a taxidermy mounting apparatus according to the invention is illustrated.
Figure 2:
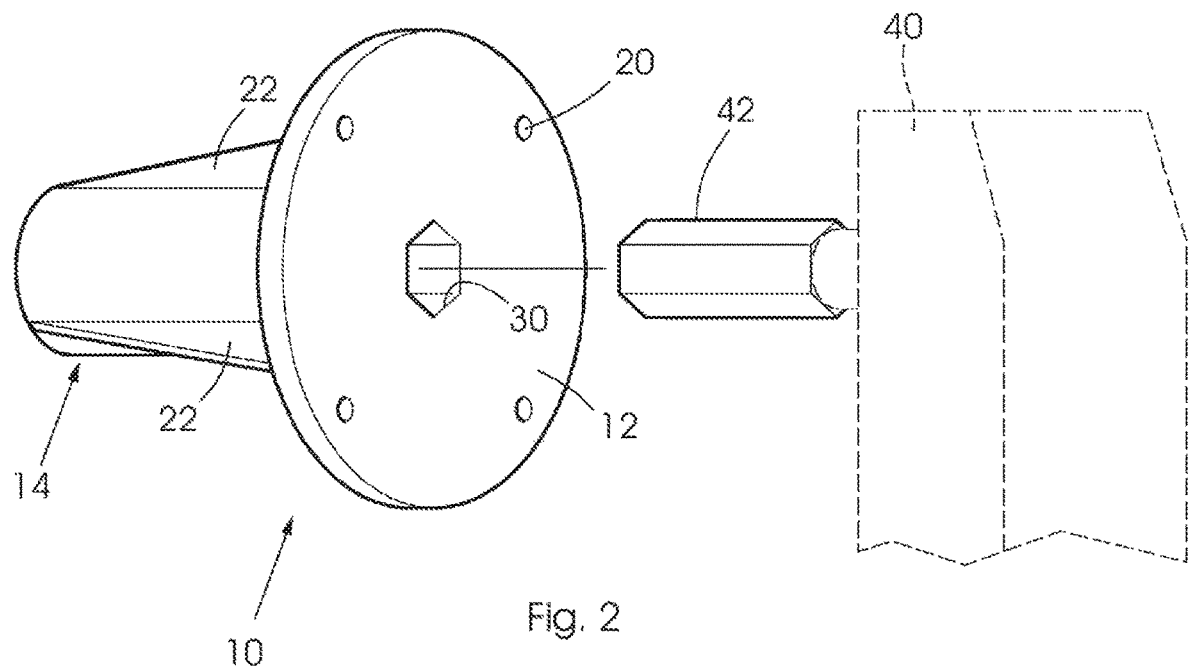
FIG. 2 is another exploded perspective view in which the taxidermy mounting apparatus is illustrated.

FIGS. 1 and 2 show a taxidermy mounting device 10 including a flange 12 and a female member 14 extending transversely from the flange. The device 10 is moulded in one piece of a suitable plastics material. The flange 12 is formed with circumferentially spaced impressions or recesses 18 and holes 20. The female member 14 has a round outer cross-section and is formed with integral, radially extending fins 22 formed with holes 24. There is an elongate, internal socket 26 extending within the female member from a blind end 28 to an open mouth 30 at the flange 12. This socket has a hexagonal cross-section as shown.

Figure 5:
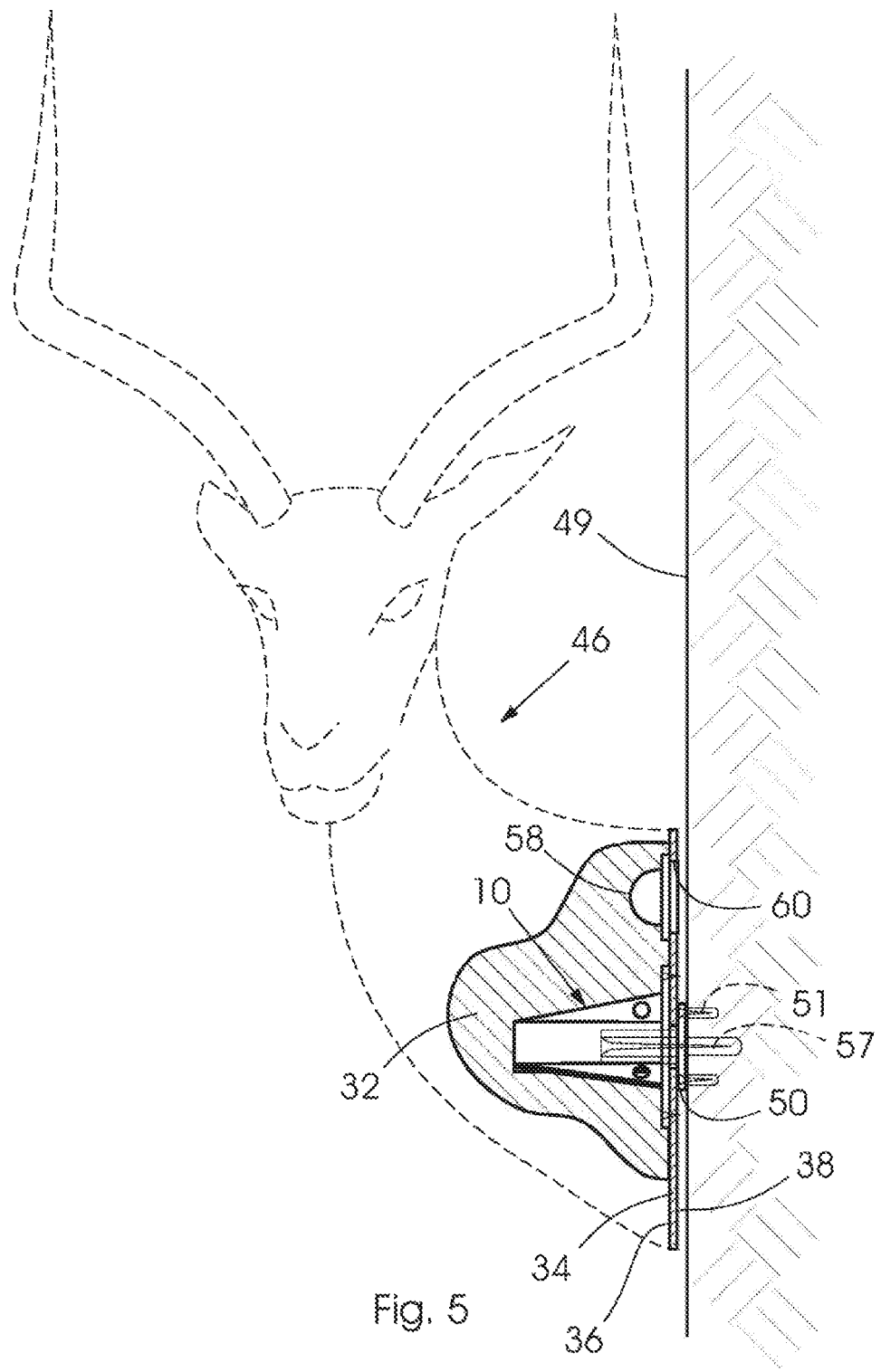
FIG. 5 shows a partly sectioned side view of the mounted taxidermy mannequin mounted using the combination apparatus of FIGS. 3 and 4.

The device 10 forms part of a taxidermy mounting system. Referring to FIG. 5, the apparatus also includes a taxidermy mannequin 32, typically of moulded polyurethane, on which the body parts of a taxidermy trophy specimen or exhibit are subsequently laid in a taxidermy procedure. The body of the mannequin 32 is moulded onto a flat backing board 34 of plywood. The backing board is shaped peripherally to match the outer profile of the mannequin and has inner and outer surfaces 36 and 38 respectively.

In use, prior to the moulding of the mannequin 32, the flange 12 of the device 10 is located against the surface 36 of the backing board and is attached to the backing board by means of screws, staples or tacks passing through the recesses and holes 20 into the plywood. The mouth 30 of the socket 26 is aligned with a preformed hole in the backing board. The mannequin is then moulded onto the backing board, over the device 10, such that the flange and female member are embedded in the moulded material. During moulding, the moulded material infiltrates the holes 24. This, together with the embodiment of the fins 22, ensures that the device 10 cannot, after moulding, rotate relative to the mannequin. After moulding, the open mouth 30 of the socket 26 is exposed though the preformed hole, mentioned above, in the backing board.

As indicated above, non-rotatability of the device 10 relative to the mannequin is ensured inter alia by the presence of the fins 22. In other embodiments, non-rotatability could be ensured by other suitable means. The outer cross-section of the female portion could for instance, have a non-round shape.

In FIGS. 1 and 2, the numeral 40 diagrammatically indicates a taxidermy stand which is used to support the mannequin 32 during the taxidermy procedure. The stand 40 can be of a conventional, fully- or semiautomated design, or could be of a conventional, manually operated design. What is not conventional about the stand 40 is that it carries a laterally projecting, rigid male member 42 of hexagonal cross-section. The cross-section of the male member 42 is such that it can be received as a complemental slide fit, at any selected one of six possible rotational positions, in the socket 26 of the female member 12 of the mounting device 10. Once the male member is slid into the socket, the mannequin cannot rotate relative to the stand 40.

In this embodiment, non-rotatability at any selected one of a number of different rotational positions is ensured by the complemental hexagonal cross-sections of the male member 42 and socket 26. In other embodiments, non-rotatability at different rotational positions could be ensured by other means. The male member could, for example, be externally splined with the socket having a correspondingly splined internal cross-section.

The mannequin is supported by the stand 40 by simply manoeuvring it as appropriate in order for the socket 26 to slide over the male member 42. The weight of the mannequin is now transmitted to the stand through the complemental engagement between the male member and socket. It will be understood that the backing board 34 does not itself carry any meaningful load.

During the taxidermy procedure, it is possible to reposition the mannequin rotationally by sliding it off the male member, rotating it to a required angular position, and sliding the socket back over the male member. Other adjustments can be made when required using normal adjustment facilities of the mounting stand.

The invention also provides a wall mount system for a taxidermy exhibit 46 (FIG. 5) of which the mannequin 32 forms part. In the illustrated case, the exhibit 46 is a shoulder-mount antelope exhibit, but it should be understood that the invention is not limited in any way to shoulder mount exhibits or to antelope or any other specific animal type.

Figure 3:
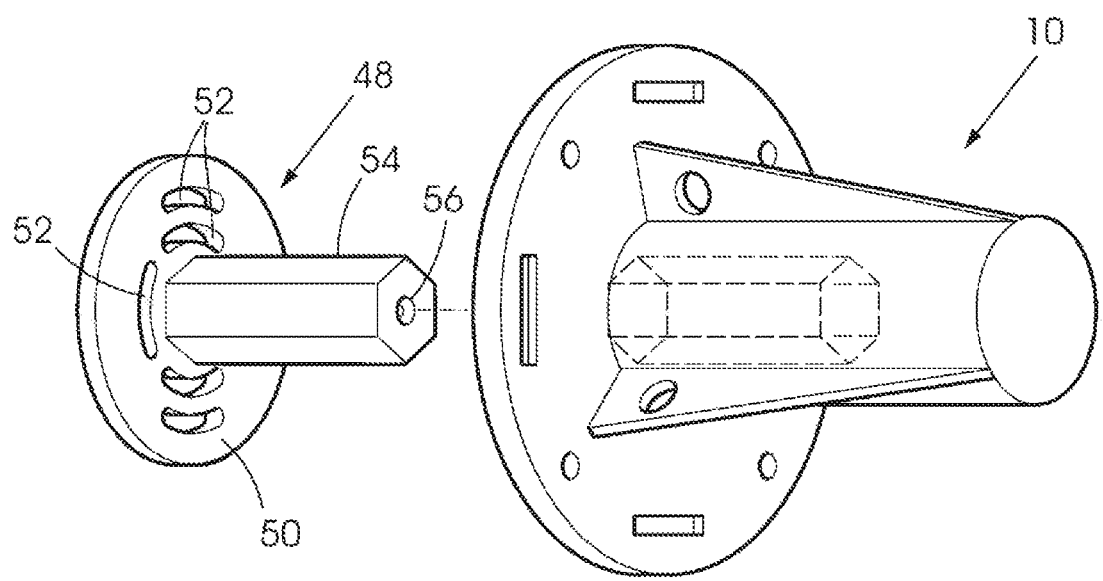
FIG. 3 is an exploded perspective view in which a taxidermy mounting apparatus for use in wall mounting is illustrated.
Figure 4:
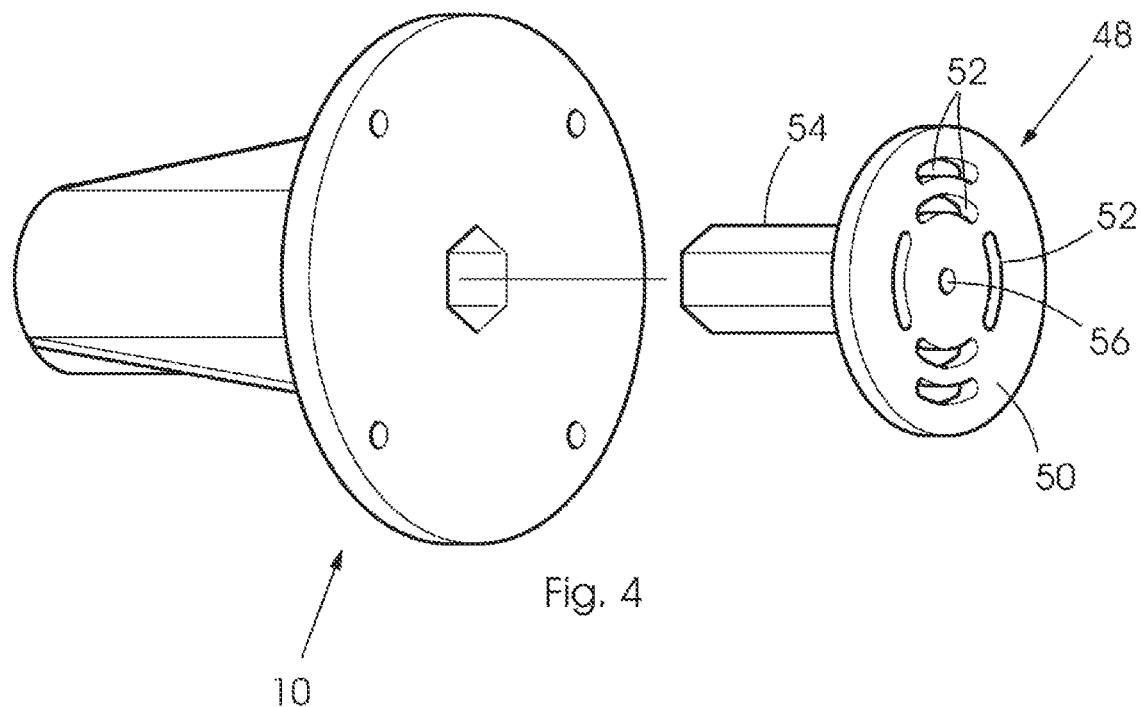
FIG. 4 is another exploded perspective view in which the apparatus for wall mounting is illustrated.

The wall mount system, seen in FIGS. 3 and 4, includes a wall mount device 48 which has a flange 50 formed with curved slots 52 and a male member 54 which projects from the flange. In use, the device 48 is secured to a wall 49 by means of suitable fasteners 51 passing through the slots 52 of the flange 50 and into wall plugs or other wall anchors in the wall. Once the device is fixed to the wall in this way, the male member 54 projects laterally relative to the wall.

In FIGS. 3 and 4, the numerals 56 indicate opposite, open ends of a hole formed longitudinally through the male member 54 and flange 50. In use, an elongate fastener 57 can be passed through this hole and into a wall plug or other wall anchor, in the wall, in order to provide extra security for the fixture of the device 48 to the wall.

In order to mount the exhibit 46 on the wall 49, the exhibit is positioned to slide the socket 26 over the male member 54 such that the male member then supports the exhibit relative to the wall.

It is preferable for the male member 54 to meet the flange 50 at a non-perpendicular angle. The axis of the shaft may be slightly angled with respect to the central axis of the flange, typically by a small angle of, say, 2°. The device 48 is fixed to the wall such that the male member 54 extends upwardly relative to the horizontal, with the result that the mounted exhibit 46 is biased gravitationally towards the wall and is less likely to slip off the male member.

Figure 11:
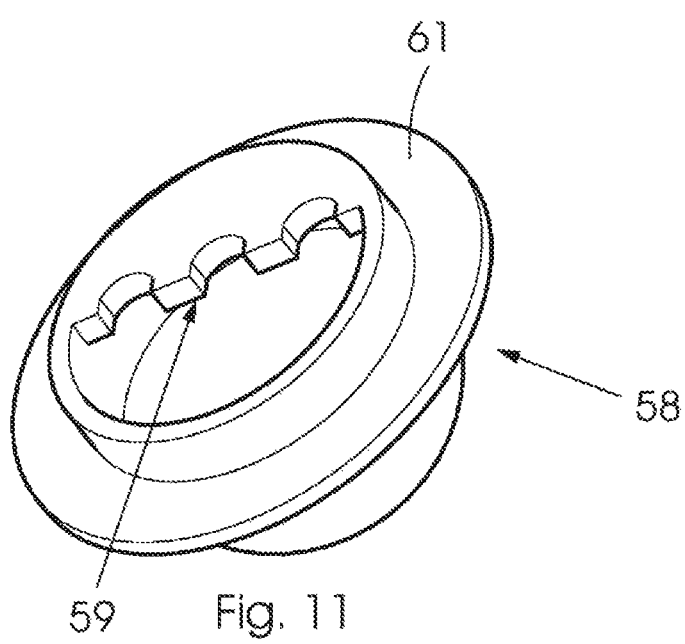
FIG. 11 shows a perspective view of a mounting socket.

In FIGS. 5 and 11 the numeral 58 indicates a moulded plastic hanger which is moulded into the body of the mannequin and which is aligned with a mounting hole 60 in the backing board 34. During wall mounting, a scalloped inner, upper edge 59 of the hanger can be hooked over a nail or other fastener engaged in the wall or surface in order to enhance the security with which the exhibit is mounted. In practice the hanger may be fastened to the backing board by means of suitable fasteners (not shown) passing through holes (not shown) in a flange 61 which locates against the surface 36 of the backboard.

Figure 6:
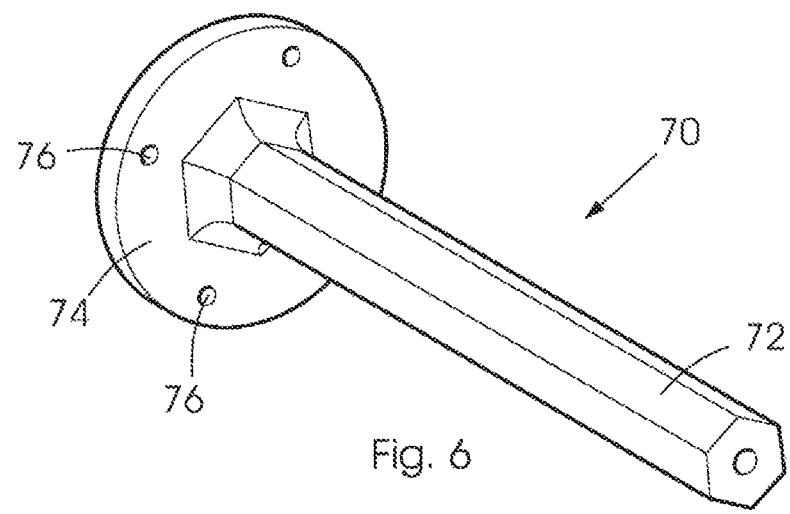
FIG. 6 shows a perspective view of a male member of another embodiment.
Figure 7:
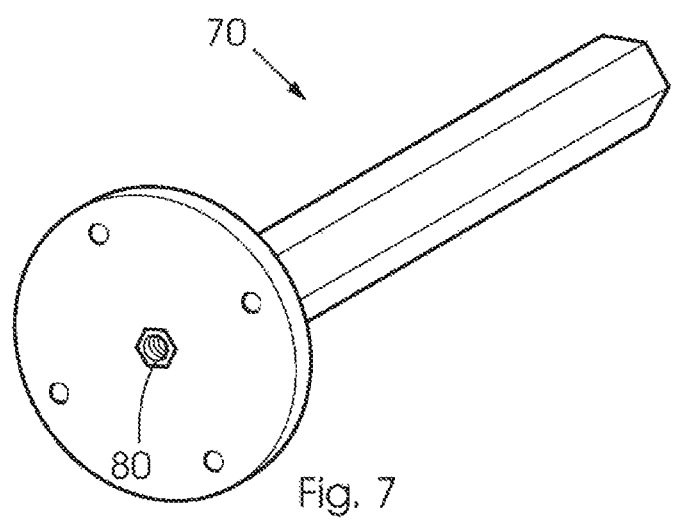
FIG. 7 shows another perspective view of the male member seen in FIG. 6.
Figure 8:
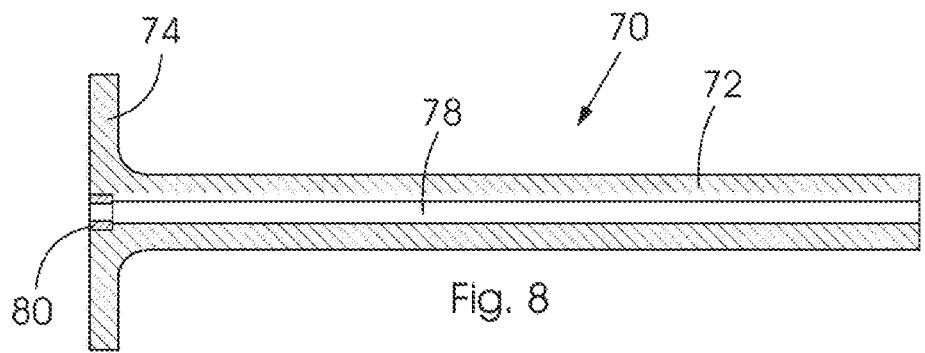
FIG. 8 shows a cross-sectional view of the male member seen in FIGS. 6 and 7.

FIGS. 6 to 8 illustrate a pedestal mount device 70 which is suitable for use, inter alia, in a pedestal mount application. In such an application, the taxidermy exhibit is supported by a vertical rod extending upwardly from a flat base which may be fixed to, or free standing on, a horizontal shelf or surface.

The pedestal mount device 70 includes a male member 72 of hexagonal cross-section and a flange 74 from which the male member projects perpendicularly. The flange is formed with spaced holes 76 and there is an elongate passage 78 extending longitudinally through the device 70. As thus far described, the device 70 is formed by a one-piece plastics moulding. Embedded in the moulding at one end of the passage 78 is a nut 80.

In use, the flange 74 is fastened to the base of the pedestal mount by means of screws or other fasteners. If a particularly robust mount is required, a threaded steel rod can, before fixture of the flange, be threaded through the nut 80 into the passage 78 with a portion of the length of the rod left projecting externally from the flange. This projecting portion can then be located in a predrilled hole in the base of the pedestal mount. The hole in the base may be threaded to receive the projecting portion of the rod in a threaded manner.

Figure 9:
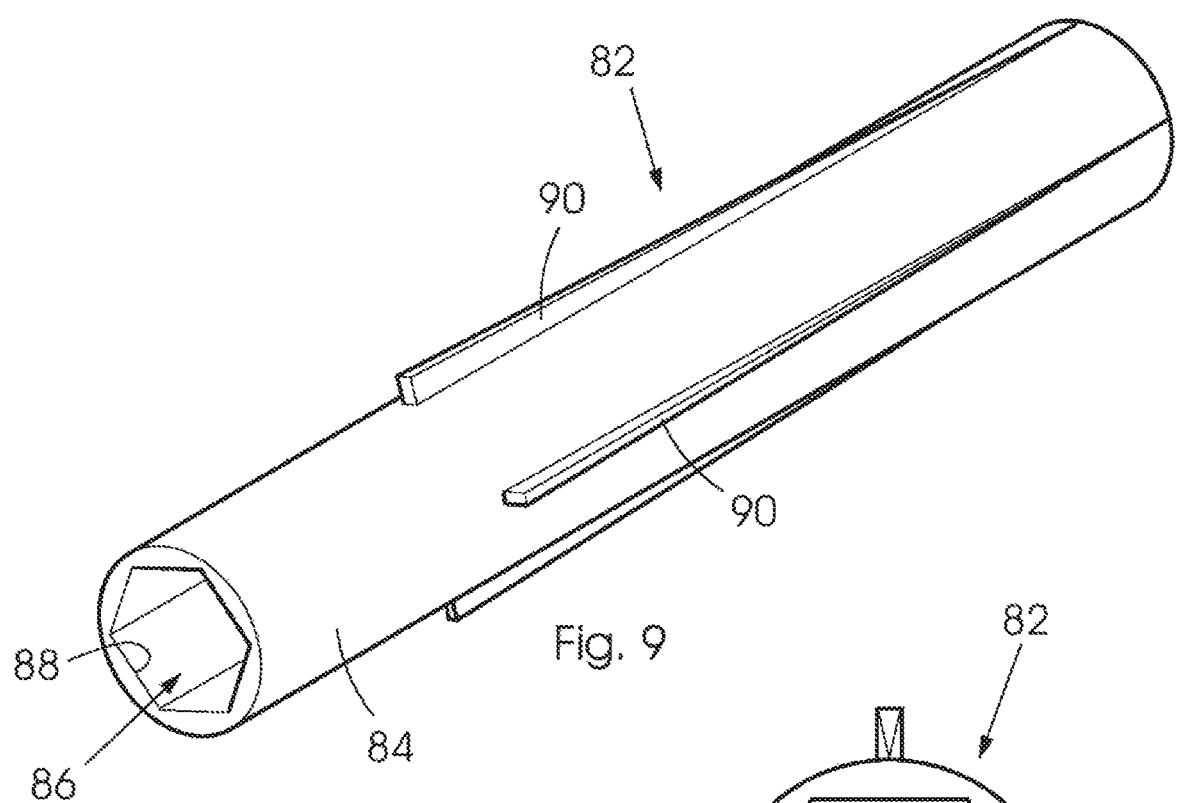
FIG. 9 shows a perspective view of a mounting device in another embodiment.
Figure 10:
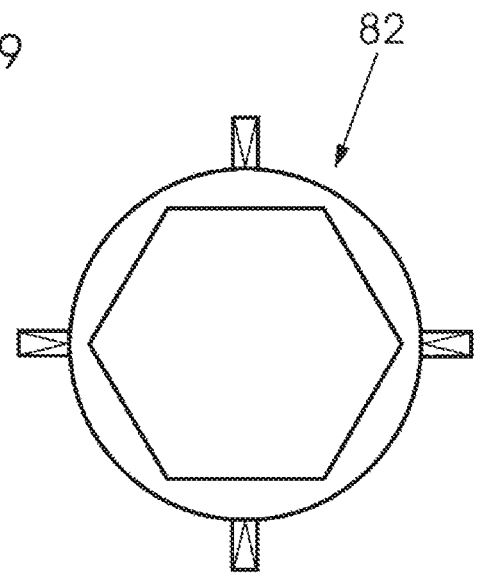
FIG. 10 shows an end view of the mounting device seen in FIG. 9.

The male member 72 is in use received as a slide fit in a vertically oriented socket in the mannequin or exhibit, thereby to support the mannequin or exhibit rigidly relative to the base. FIGS. 9 and 10 illustrate a mounting device 82 that provides a suitable socket.

The mounting device 82 includes a moulded plastics female member 84 with an internal, hexagonal socket 86 extending to an open mouth 88 and external radially extending fins 90. In use, a hole is drilled into the bottom of the mannequin or exhibit through a backing board on which the mannequin is moulded. The diameter of the hole is selected such that the female member can be inserted into the hole as a tight fit. A suitable adhesive is then introduced into the drilled hole, whereafter the female member 84 is pushed into the hole. The adhesive is allowed to set to anchor the female member non-rotatably in the body of the mannequin.

The mannequin or exhibit can then be located on the pedestal mount by lowering it such that the male member 72 of the device 70 slides into the socket 86 with the result that the device 70 then supports the mannequin or exhibit non-rotatably relative to the base.

An advantage of the illustrated embodiments is the fact that the mating socket and male member can provide secure, non-creeping support for the mannequin during a taxidermy procedure and subsequently in a wall or pedestal mount application. Arising from this is another advantage, namely the fact that the backing board does not carry meaningful load, which means that it can be made of relative thin plywood, thereby potentially reducing the cost of the taxidermy procedure and the overall weight of the mannequin/backing board combination and of the final exhibit itself.

The invention claimed is:

1. A taxidermy mounting apparatus, comprising:
a flat backing board having an opening;
a mannequin molded on the flat backing board, the flat backing board being shaped to match an outer profile of the mannequin; and
a mounting device for use in mounting the mannequin and flat backing board relative to a supporting structure, the mounting device being molded as a single component from a plastic material and comprising a female member fixed non-rotatably in the mannequin, wherein the female member includes an elongated body having a plurality of irregularities formed on an exterior surface for anchoring the mounting device within the mannequin and an elongate socket having a blind end, the elongate socket extending to an open mouth which is axially aligned with the opening in the flat backing board, the elongate socket being configured to receive, in use and an in non-rotatable manner, an elongate male member extending laterally from the supporting structure, such that the elongate male member can then support the mounting apparatus relative to the supporting structure.

2. The taxidermy mounting apparatus of claim 1, wherein the mounting device includes an integral flange from which the elongated body of the female member extends transversely with the open mouth of the elongate socket at the flange.

3. The taxidermy mounting apparatus of claim 2, wherein the flange is located against a rear surface of the flat backing board with the open mouth of the elongate socket being accessible through the opening in the flat backing board.

4. The taxidermy mounting apparatus of claim 2, wherein the flange is attached to the flat backing board by means of at least one suitable fastener.

5. The taxidermy mounting apparatus of claim 1, wherein the elongate socket of the female member has a non-round cross-section for non-rotatable reception of the elongate male member having a complementary, non-round cross-section.

6. The taxidermy mounting apparatus of claim 1, wherein the elongate socket of the female member has a hexagonal cross-section for receiving a complementary hexagonal cross-section of the elongate male member.

7. The taxidermy mounting apparatus of claim 1, wherein the elongate socket of the female member is internally splined for receiving the elongate male member, which is externally splined.

8. The taxidermy mounting apparatus of claim 1, wherein the plurality of irregularities comprise a set of radial tapering fins formed in a circumferentially spaced relation on the exterior surface of the elongated body of the female member.

9. The taxidermy mounting apparatus of claim 1
further comprising a wall mount device comprising a flange for location against and fixture to a wall in which the elongate male member projects from the flange for slidable, non-rotatable reception in the elongate socket of the female member of the taxidermy mounting apparatus whereby the mounting apparatus is supported relative to the wall by the elongate male member and in which the elongate male member does not project at a perpendicular angle from the flange to better enable the non-rotatable reception between the wall mount device and the mounting member.

10. A mounting device for use in a taxidermy mounting apparatus, the taxidermy mounting apparatus comprising a mounting device, a flat backing board and a mannequin molded on the flat backing board, the flat backing board being shaped to substantially match an outer profile of the mannequin, the mounting device comprising:
a female member made from a plastic molded material having an elongated body extending transversely from an integral flanged portion including a plurality of tapered fins circumferentially spaced about an outer surface of the elongated body, said female member an elongate socket extending into the elongated body and having a blind end, the elongate socket extending to an open mouth, the female member being non-rotatably moldable in a body of the mannequin with the open mouth of the elongate socket positioned to receive, in use and in a non-rotatable manner, an elongate male member extending laterally from a supporting structure, such that the elongate male member can then support the mounting apparatus relative to the supporting structure.

11. A method of supporting a taxidermy mannequin and a flat backing board on which the mannequin is molded, the flat backing board being shaped to match an outer profile of the mannequin, the method comprising the steps of:
providing a taxidermy mounting device which comprises a female member made from a molded plastic having an elongated body extending transversely from an integral flanged portion, the female member being fixed non-rotatably in the mannequin and including a plurality of tapered fins circumferentially spaced about an outer surface of the elongated body, the female member having an elongate socket formed in the elongated body to a blind end and extending to an open mouth aligned with an opening in the flat backing board;
providing a supporting structure that includes a laterally projecting male member which is slidably and non-rotatably receivable in the elongate socket of the taxidermy mounting device at any selected one of a plurality of rotational positions; and
sliding the male member of the supporting structure into the elongate socket of the taxidermy mounting device thereby to support the mannequin relative to the supporting structure.

12. A method of mounting a taxidermy exhibit to a wall, the taxidermy exhibit including a taxidermy mannequin and a flat backing board on which the taxidermy mannequin is molded, the flat backing board having a shape that matches an outer profile of the mannequin, the method comprising the steps of:
providing a taxidermy mounting device which comprises a plastic molded female member having an elongated body extending transversely from an integral flanged portion, the female member being fixed non-rotatably in the taxidermy mannequin and having an elongate socket extending from an open mouth at the integral flanged portion aligned with an opening in the flat backing board to a blind end formed within the elongated body;
providing a wall mount device comprising a flange for location against and fixture to a wall and a male member projecting from the flange of the wall mount device for non-rotatable slide reception in the elongate socket of the taxidermy mounting device;
sliding the male member of the wall mount device into the elongate socket of the taxidermy mounting device thereby to support the taxidermy exhibit relative to the wall, and in which the male member projects at a non-perpendicular angle relative to the flange of the wall mount device to assist in the non-rotatable slide reception between the wall mount device and the taxidermy mounting device.

* * * * *